Patented Sept. 15, 1936

2,054,065

UNITED STATES PATENT OFFICE 2,054,065

METHOD OF TREATING MILK PRODUCTS AND RESULTING PRODUCTS

Samuel Henry Ayers and Charles W. Lang, Brooklyn, N. Y., assignors, by mesne assignments, to The Crown Cork and Seal Company, Inc., New York, N. Y., a corporation of New York No Drawing. Application August 20, 1932, Serial No. 629,718

18 Claims. (Cl. 99—216)

This invention relates to the art of packing products generally classified in the milk industry. In particular, it relates to the methods of treating and packaging such products and to the resulting packaged products.

The present invention is applicable to such dairy products as whole and evaporated milk, cream of various compositions, cream mixtures containing milk or cream as exemplified by frozen desserts, including ice cream, mousses, milk sherbets and the like and creamed products which includes milk or cream with other ingredients such as flour or other suitable thickeners.

In the interest of brevity and certainty, the expression "milk products" is used in this specification to designate the foregoing and analogous substances, and is to be read and interpreted with that understanding.

Broadly described, the present invention as practiced on milk products comprises the steps of subjecting the milk products in the final containers to the sterilizing action of steam under such conditions that the products will be commercially sterilized, will not show any material amount of discoloration or variation of taste or flavor from that of the same substance in an unsterilized, pasteurized condition, and sealing the containers with steam therein under greater than atmospheric pressure. Many variations of these steps may be employed and many additional steps may be combined, separately or collectively, with the foregoing steps or variations thereof. For example, the milk products may be concentrated, before the sterilization step, sufficiently to compensate for the diluting action of the steam which may condense in the container during and after sterilization. The air may be removed from the containers and the milk products therein by subjecting the containers and their contents to vacuumizing treatment during the process.

The milk products may be homogenized before being placed in the containers. The containers and their contents may be, and preferably are, preheated preliminary to the sterilizing step. The containers and their contents may be more or less rapidly cooled after the sterilization step, or may have their temperature sustained for a period of time after sterilization. Various stabilizers, such for example as sodium di-basic phosphate, sodium citrate, and the like, may be added in suitable percentages to the products, particularly cream, prior to the preheating of the products preliminary to homogenizing for various purposes, including those of helping to give a smooth body to the product, or to assist in preventing separation of fat. The sterilizing step may be, and preferably is, so carried out that a relatively high vacuum exists in the finally sealed containers.

The milk products treated and packaged according to this invention are maintained in the container under a high vacuum such as above about 18 inches of mercury, are commercially sterile, do not possess taste, flavor or color different to a marked or substantial degree from freshly pasteurized products of substantially the same composition, and have little or no tendency to become rancid while in the container. Even after the containers are opened the products so packaged remain sweet longer than the fresh product. Moreover, these products possess increased smoothness and improved texture, due in part, it is believed, to the violent agitation to which the products are subjected during the sterilizing step. In the case of cream so packaged, there is in addition to the foregoing properties, no substantial separation of butter-fat.

Dessert mixtures, such as those suitable for ice cream, mousses, milk sherbets and the like, may be stored in packaged form and frozen before the containers are opened. Agitation during freezing is not necessary. The frozen mixture has a smooth body and texture characteristic of similar frozen mixtures prepared by ordinary methods.

It has been observed that evaporated milk treated according to this invention apparently possesses a sweeter taste than evaporated milk sterilized by any of the usual present day processes.

The present invention will be understood by those skilled in the art from the following detailed description of the invention as it may be practiced on cream.

Cream, which is to be treated and packaged according to the present invention, may be obtained by different methods. For example, whole milk may be evaporated to remove therefrom approximately the amount of water which will be added to the product during the sterilization step. After such evaporation, the whole milk may be separated to obtain cream containing the desired butter fat content, plus additional fat to compensate for the steam dilution during the sterilizing step. Such cream is then ready for treatment according to this invention. Alternatively, the cream may be obtained by first separating whole milk to produce cream of the desired butter fat content, after which such cream may be concentrated by evaporation to remove water therefrom to the extent necessary to compensate for the steam which will be condensed therein during the sterilizing and subsequent steps. Cream so prepared is then ready for treatment according to the present invention. These two alternative methods of preparing cream for treatment by this process, may obviously be varied and other methods may be employed for obtaining cream of the desired concentration and butter fat content, as will be obvious to those skilled in the art.

The ratio of fat to solids not fat normal to an 18% cream may be increased by starting with a given ratio and varying it by the dilution which occurs during sterilization. For example, to obtain a product containing about 18% butter fat, milk is separated to produce cream of about 20% butter fat, and, during sterilization, is diluted about 10%, thus reducing the fat to about 18% but increasing the ratio of fat to solid not fat as compared to normal 18% cream. The ratio of fat to solid not fat may also be made normal slightly increased or decreased. For example, milk may be separated to produce cream of about 20% butter fat. Skim milk powder if added in suitable quantities would result in a product, after a 10% dilution during sterilization, having about 18% of fat and a ratio thereto of solids not fat which could be normal or above or below normal depending on the amount of powder so added. Similarly, a cream-like product with an abnormal composition but with the same final definite butter fat content may be produced by the addition of milk solids not fat, such as milk albumen, to a cream having about a 20% butter fat content, and then sterilizing as described.

The cream prepared according to any of the foregoing or equivalent methods, is then ready for treatment by the present process. Where it is desired that the finished product shall have a smooth body and little or no separated fat, the cream may be stabilized by the addition thereto of any suitable, well known, stabilizer, such as a small amount of sodium di-basic phosphate or sodium citrate. These stabilizers may be added to the milk or cream prior to or after the foregoing described concentration, but if added after concentration, are preferably added prior to homogenization.

The cream prepared as just described, may be homogenized, that is, so treated that the particles of fat are more finely divided and split up, and separation of the fat in the final product is retarded or reduced to a minimum. In addition, the homogenization removes substantially all the cooked flavor which may have developed during the heating of the cream preliminary to homogenization. Cream which has been homogenized does not develop a cooked taste when sterilized according to the present invention.

In order to homogenize the cream, it may be, and preferably is, brought to a temperature between about 150° F. and about 180° F. and then run thru a suitable homogenizer of any standard or well known construction at pressures ranging from about 1500 to about 2500 pounds in the first stage of the machine and lower pressures, for example between about 200 pounds and about 1000 pounds in the second stage of the machine. While other temperatures and pressures may be satisfactory for some purposes, and one stage only may be employed, it is preferred that the two stages and temperatures and pressures within these ranges be employed, for thereby such defects as coagulation, separation and feathering, are more or less completely avoided.

After the cream has been homogenized as just described, it is placed in the final containers and, if it is not at a sufficiently high temperature, the containers and their contents are heated to within the desired temperature range preliminary to sterilization. The particular temperature selected depends upon the particular temperatures being employed in the sterilization step which follows immediately thereafter, and upon other factors presently to be set forth. In practice, satisfactory results are obtained where the cream in the containers is at a temperature between about 140° F. and about 175° F. at the time the containers are subjected to sterilization and where the temperature is to be raised by the sterilization step to about 240° F. or above in a short time. It will be understood, that where the temperatures to be attained in the sterilizing step, or the time during which such temperatures are attained, are varied from those just mentioned, the temperature attained by the cream before sterilization should also be varied.

The cream in the containers is then sterilized. The sterilization may, and preferably does, include a vacuum treatment which removes the air from the container and to greater or less degree from the cream. Then live steam, under pressure, is immediately introduced into the contents of the containers for a suitable length of time and in a manner to cause violent agitation of the cream and to bring the steam into contact with substantially all portions of the cream, as may be done by passing the steam up thru the cream, after which the container is closed by means of the steam pressure within the container and then the container is permanently sealed. The cream is preferably raised to above about 250° F. within a short length of time, such as about fifteen seconds, by the use of live steam at temperatures ranging between about 260° F. and about 280° F. Steam temperatures above this range may be used where the containers are capable of withstanding the increased pressure.

After this sterilizing treatment has been completed and the containers have been sealed, the containers and their contents may be quickly cooled, as by spraying with cold water, or they may be maintained to above about 212° F. by permitting them to cool in air in an insulated compartment, with or without application thereto of additional heat, in which case the rate of cooling is relatively slow, or by immersing them in boiling water or surrounding them with live steam at 212° F., in which cases the rate of cooling is more rapid than in air in the insulated compartment. Ordinarily, a period of about five minutes during which the temperature is maintained at above about 212° F. is sufficient for most purposes. The contents of the containers may be agitated during the sustaining or cooling steps by any suitable means such as shakers.

One of the desirable results traceable to this sustaining step, in the case of cream, is that the cream is maintained for a sufficiently long time at a temperature high enough to complete the sterilization initiated during the sterilizing step proper. The need for the sustaining step may be largely, if not entirely, obviated by the use of suitably high temperatures such as 250° F. or higher during the sterilizing step. The time of the sustaining step should not be long enough to result in an appreciable cooked taste or darkened color.

There are several factors which can, and preferably should be, correlated with one another for obtaining the best results. These factors include the temperature of the cream preliminary to sterilization, the temperature and pressure of the steam used during sterilization, the length of time during which the steam under pressure is acting upon the cream and the extent to which the container and its contents are vacuumized preliminary to sterilization. Upon these factors and their correlation depends largely the final vacuum in the container after sterilization, the final temperature of the cream, and the amount of dilution.

To attain a given final temperature at the end of the sterilizing step, the temperature, pressure and amount of steam used during sterilizing, depends on the temperature of the cream in the container preliminary to sterilization, and on the amount of vacuum or absolute pressure in the container. With the cream at the lower temperatures, a greater amount of steam at a given temperature and pressure is required to heat a given volume of the cream in the container to a predetermined temperature. The higher the temperature of the cream, the lower may be the temperature and pressure of the steam, or the smaller may be the amount of steam required at a higher temperature and pressure. The greater the amount of steam employed, the greater will be the amount of steam condensation in the container. The temperature and pressure of steam required to raise a given amount of cream in the container to the predetermined temperature, depends to some extent upon the amount of vacuum or the absolute pressure existing in the container just before the steam is admitted. A vacuum slightly lower than that which will cause excessive boiling of the cream, permits of the use of steam at lower temperatures than otherwise is the case. Accordingly, it is preferred that the cream should be at a temperature between about 140° F. and about 175° F. preliminary to sterilization; that if vacuumizing is resorted to it should not be carried out at vacuum greater than that which will not quite produce excessive boiling of the cream; that the steam pressure and temperature should be sufficiently high to raise the cream to a temperature above about 240° F. within a short period of time such as about fifteen seconds, and not sufficiently high to weaken or distort the container or produce leaks therein thru excessive pressure; and that the steam used will not cause dilution of the cream beyond the amount predetermined before and compensated for during concentration of the latter.

The control and correlation of these several factors results in substantial uniformity of the product and make possible the use of the process in large scale commercial production.

Containers and apparatus suitable for carrying out this invention are herein disclosed. Some of the desirable characteristics and features thereof are as follows:

It is important that the containers should be provided with means, such for example as valves, thru which gases may be withdrawn from the container and thru which steam under pressure may be introduced into the container and its contents. Such a means should be capable of being closed by means of steam pressure in the container and easily and readily sealed permanently against leakage of gases into or out of the container. Preferably, the container should be so constructed that it may be capped or otherwise more or less completely closed after a predetermined amount of the milk product has been put thereinto so that the milk product is more or less kept from contact with the air after being placed in the container. This may be done conveniently in the case of ordinary sanitary cans by securing the valve carrying can end to the can body after the milk product is put into the can by a filling machine. Satisfactory results have been obtained, according to this invention, by employing valved containers like those shown in U. S. Patent No. 1,728,533.

One form of sterilizing apparatus which has given good results, according to the present invention, is shown, described and claimed in the copending application of John Mills, Serial No. 629,678, filed on August 20, 1932.

Having thus described the present invention so that those skilled in the art may be able to practice the same, what is desired to be secured by Letters Patent is defined in what is claimed, it being understood that the foregoing detailed description has been made only for the purpose of illustration and not for the purpose of limiting the present invention to the details set forth.

What is claimed is:

1. The method of treating cream which includes the steps of concentrating the cream by removing water from it, homogenizing such cream, placing it in a final container, subjecting such cream in the container and at a suitable temperature to the sterilizing action of steam passing thereinto under pressure, thereby also compensating partly for the removed water and sealing the container permanently with steam therein under greater than atmospheric pressure.

2. The method of treating milk products which includes the steps of concentrating a milk product by removing part of the water therefrom, placing it in a final container, subjecting the milk product in the container at a suitable temperature to the sterilizing action of steam passing through a valve thereinto under pressure, thereby also adding water to said milk product to compensate partly for that removed by said concentrating step, utilizing the steam pressure within the container to close the valve and sealing the container permanently with steam therein under greater than atmospheric pressure.

3. The method of treating milk products which includes the steps of concentrating the milk product by removing a part of the water therefrom, homogenizing the thus concentrated product, then placing the product in the final container and subjecting it in the container at a suitable temperature to the sterilizing action of steam passing thereinto under pressure, thereby also adding water to such milk product to compensate in part for that removed by the step of concentration and sealing the container permanently with steam therein under greater than atmospheric pressure.

4. The method of treating milk products which includes the steps of removing gases from a final container containing a partially concentrated milk product at a suitable temperature, bringing steam at a sterilizing temperature into intimate contact with substantially all portions of the milk product in the container in a manner to heat the milk product to above about 240° F., and also to add water to compensate partially for that removed by concentration, sealing the container with steam therein under greater than atmospheric pressure, and cooling the milk product to below about 212° F. within about five minutes.

5. The method of treating milk products which comprises the steps of removing about 10% of the water of a milk product, subjecting such milk product in a final container to steam at a sterilizing temperature by bringing the steam into intimate contact with substantially all portions of the milk product in the container, thereby also adding water to the milk product to compensate partly for that removed during concentration, sealing the container with steam therein under greater than atmospheric pressure, and maintaining the temperature of the container and its contents at above about 212° F. for a sufficient length of time to produce commercially complete sterilization.

6. The method of treating milk products which includes the step of removing about 10% of the water from a milk product, removing gases from the final container containing such milk product, bringing steam at a suitable temperature, bringing steam at a sterilizing temperature into intimate contact with substantially all portions of the milk product in the container and heating such milk product to above about 240° F., thereby also adding water to the milk product to compensate partly for that removed during concentration, sealing the container with steam therein at a pressure greater than atmospheric, and maintaining the temperature of the container and its contents above about 212° F. for a sufficient length of time to complete commercial sterilization of the milk product therein.

7. The method of treating milk products which includes the steps of removing about 10% of the water from the milk product, subjecting such milk product in the final container at between about 140° F. and about 175° F. to the sterilizing action of steam at a temperature of between about 280° F. to about 260° F., by bringing such steam into contact with substantially all of the milk product in the container, thereby also adding water to compensate partly for that removed during concentration and sealing the container with steam therein at high pressure.

8. The method of treating milk products which comprises placing in a container a milk product having about 10% greater concentration than is desired in the finished product, subjecting the contents of the container at a temperature between about 140° F. and about 175° F. to the sterilizing action of steam at a temperature between about 280° F. and about 260° F., by bringing such steam into contact with substantially all portions of the milk product in the container, controlling the amount of steam condensing in the container to produce a product of the desired concentration and sealing the container permanently with steam therein under greater than atmospheric pressure.

9. The method of treating a milk product which includes the step of concentrating a milk product to about 90% of the final desired volume, heating such concentrated milk product to between about 150° F. and about 175° F. and then homogenizing it in two steps at pressure ranging respectively between about 1500 and about 2500 pounds and between about 200 and about 1,000 pounds, placing such homogenized milk product in a final container and removing gases from the latter when the milk product is at temperatures between about 140° F. and about 175° F., by subjecting the interior of the container to a vacuum slightly below that which will produce excessive boiling of the milk product, then immediately causing violent agitation of the milk product in the container by passing thereinto steam at temperatures ranging between about 280° F. and about 260° F., thereby also adding water to bring the milk product approximately to its final desired volume, expelling gases from the container and its contents by lowering the pressure within the container, sealing the container while its contents are above about 240° F., and maintaining the temperature of the container and its contents above about 212° F. for a period not exceeding about five minutes.

10. The method of treating a milk product which includes the steps of concentrating a milk product to about 90% of the final desired volume, placing the concentrated milk product in a final container and removing gases from the container when the milk product is at temperatures between about 140° F. and about 175° F., by subjecting the interior of the container to a vacuum slightly below that which will produce excessive boiling of the milk product, then immediately causing violent agitation and about a 10% dilution of the milk product in the container by passing steam thereinto through a valve in the container at temperatures ranging between about 280° F. and about 260° F., closing the valve by relieving the pressure on the outside thereof and sealing the container permanently while its contents are above about 240° F.

11. The method of treating a milk product which includes the steps of concentrating a milk product to about 90% of its final desired volume, preheating it for homogenization between 150° F. and about 175° F., homogenizing this preheated milk product, placing such homogenized milk product in a final container and removing gases from the latter by subjecting the interior of the container to a vacuum, then causing violent agitation and about 10% dilution of the milk product in the container by passing steam thereinto at temperatures between about 280° F. and about 260° F., sealing the container while its contents are above about 240° F., and maintaining the temperature of the milk product in the container above about 212° F. for a period not exceeding about five minutes.

12. The method of treating milk products which includes the steps of vacuumizing a final container containing a partially concentrated milk product at a temperature between about 140° F. and about 175° F., immediately thereafter sterilizing the milk product by introducing steam thereinto in such a manner as to bring the steam into contact with substantially all portions of the milk product and to compensate for the water removed therefrom during partial concentration thereof, increasing the amount of vacuum in the final sealed container by releasing some of the steam pressure from the container after sterilization and before final sealing of the container, and sealing the container with steam therein under greater than atmospheric pressure.

13. In the process of treating milk products in which gases are removed from the final container partly filled with a milk product at a suitable temperature and concentration, followed by passage of steam under high pressure thru the milk product in the container, the permanent sealing of the container after such steam treatment and the final cooling of the contents of the container, the steps of correlating the temperature of the milk product in the container, the amount of vacuum applied to remove the gases from the container, the temperature, pressure and amount of steam introduced into the food product in the container, and the rate of cooling of the contents in the closed container so that: the milk product is heated by the steam to between about 240° F. and about 260° F. within about fifteen seconds' time, the milk product, in the cold container, has a volume exceeding by not more than about 10% the volume previous to the foregoing treatment, is sealed in the final container against gas leakage under a vacuum of above about 16" of mercury, the gas content in the container is relatively small with a negligible amount of free oxygen calculated on the basis of the nitrogen present, and the food product is commercially sterile.

14. A commercially sterile milk product under high vacuum in a sealed container which has been concentrated to about 90% of the concentration desired in the finished product, vacuumized, homogenized, sterilized and diluted to substantially the desired concentration by introduction of steam at temperatures between about 260° F. and about 280° F. into the product in the final container followed by sealing of the container with steam therein under greater than atmospheric pressure, and which milk product has then been maintained at a temperature sufficiently long to complete the sterilization initiated during the sterilization step but not long enough to result in an appreciable cooked taste or darkened color.

15. The method of treating milk products, which includes the steps of concentrating a milk product by removing about 10% of water therefrom, placing such milk product in a final container, subjecting the milk product in the container and at a suitable temperature to the sterilizing action of steam passing thereinto under pressure, thereby also adding about 10% of water to the milk product, and sealing the container permanently with steam therein under greater than atmospheric pressure.

16. The method of treating milk products which includes the steps of vacuumizing, for a few seconds, a milk product partially filling a final container and having a concentration of about 90% of the final desired volume and a temperature of between about 140° F. and about 175° F., diluting the milk product to about its final desired concentration and heating the milk product to between about 250° F. by bringing steam at a temperature of between about 260° F. and about 280° F. into contact with substantially all the milk product in the container, sealing the container, and cooling the milk product in the container to below about 212° F., as soon as the sterilization has been completed but before an appreciable cooked state or darkened color has been created.

17. The method of treating milk products which includes the steps of vacuumizing, for a few seconds, a milk product partially filling a final container and having a concentration of about 90% of the final desired volume and a temperature of between about 140° F. and about 175° F., diluting the milk product to about its final desired concentration and heating the milk product to above about 250° F. by bringing steam at a temperature of between about 260° F. and about 280° F. into contact with substantially all the milk product in the container for a period of a few seconds, sealing the container, and quickly cooling the milk product in the container to below about 212° F.

18. A commercially sterile milk product under high vacuum in a sealed container which has been concentrated to about 90% of the concentration desired in the finished product, vacuumized, homogenized and sterilized by being heated to above about 250° F. by introduction of steam at temperatures between about 260° F. and about 280° F. into the product in the final container followed by sealing of the container with steam therein under greater than atmospheric pressure and which milk product has been quickly cooled to below 212° F.

S. HENRY AYERS.
CHARLES W. LANG.